United States Patent
Satzger et al.

(10) Patent No.: US 8,396,245 B2
(45) Date of Patent: Mar. 12, 2013

(54) DEVICE AND METHOD FOR VISUALIZING POSITIONS ON A SURFACE

(75) Inventors: Wilhelm Satzger, Munich (DE); Roland Hessert, Markt Indersdorf (DE)

(73) Assignee: MTU Aero Engines GmbH, Munich (DE)

( * ) Notice: Subject to any disclaimer, the term of this patent is extended or adjusted under 35 U.S.C. 154(b) by 1077 days.

(21) Appl. No.: 12/097,868

(22) PCT Filed: Dec. 12, 2006

(86) PCT No.: PCT/DE2006/002206
§ 371 (c)(1),
(2), (4) Date: Nov. 19, 2008

(87) PCT Pub. No.: WO2007/076780
PCT Pub. Date: Jul. 12, 2007

(65) Prior Publication Data
US 2009/0238402 A1    Sep. 24, 2009

(30) Foreign Application Priority Data

Dec. 17, 2005 (DE) .......................... 10 2005 060 606

(51) Int. Cl.
*G06K 9/00* (2006.01)
(52) U.S. Cl. ..................... 382/100; 382/128; 382/132
(58) Field of Classification Search ............... 382/100
See application file for complete search history.

(56) References Cited

U.S. PATENT DOCUMENTS

| | | | |
|---|---|---|---|
| 5,363,469 A | 11/1994 | Elderfield | |
| 5,406,042 A * | 4/1995 | Engelfriet et al. | 219/121.68 |
| 5,446,635 A | 8/1995 | Jehn | |
| 6,190,363 B1 * | 2/2001 | Gabbard et al. | 604/220 |
| 6,314,315 B1 * | 11/2001 | Hung et al. | 600/547 |

FOREIGN PATENT DOCUMENTS

| | | |
|---|---|---|
| DE | 33 33 428 A1 | 4/1985 |
| DE | 197 30 885 A1 | 1/1999 |
| DE | 10 2004 050 428 A1 | 4/2006 |

* cited by examiner

*Primary Examiner* — Tom Y Lu
(74) *Attorney, Agent, or Firm* — Crowell & Moring LLP

(57) ABSTRACT

A device and a method are disclosed for visualizing positions on a surface by means of a marking which is produced by an optically detectable radiation. In order to permit a residue-free marking which can be observed with a camera from partly extremely oblique observation directions, the device has an optical waveguide, which is coupled to a radiation source and whose light output region can be located at a desired position of the surface in order to emit optically detectable radiation at the desired position of the surface through the optical waveguide. As a result, the radiation is emitted at the desired position of the surface in various spatial directions.

15 Claims, 1 Drawing Sheet

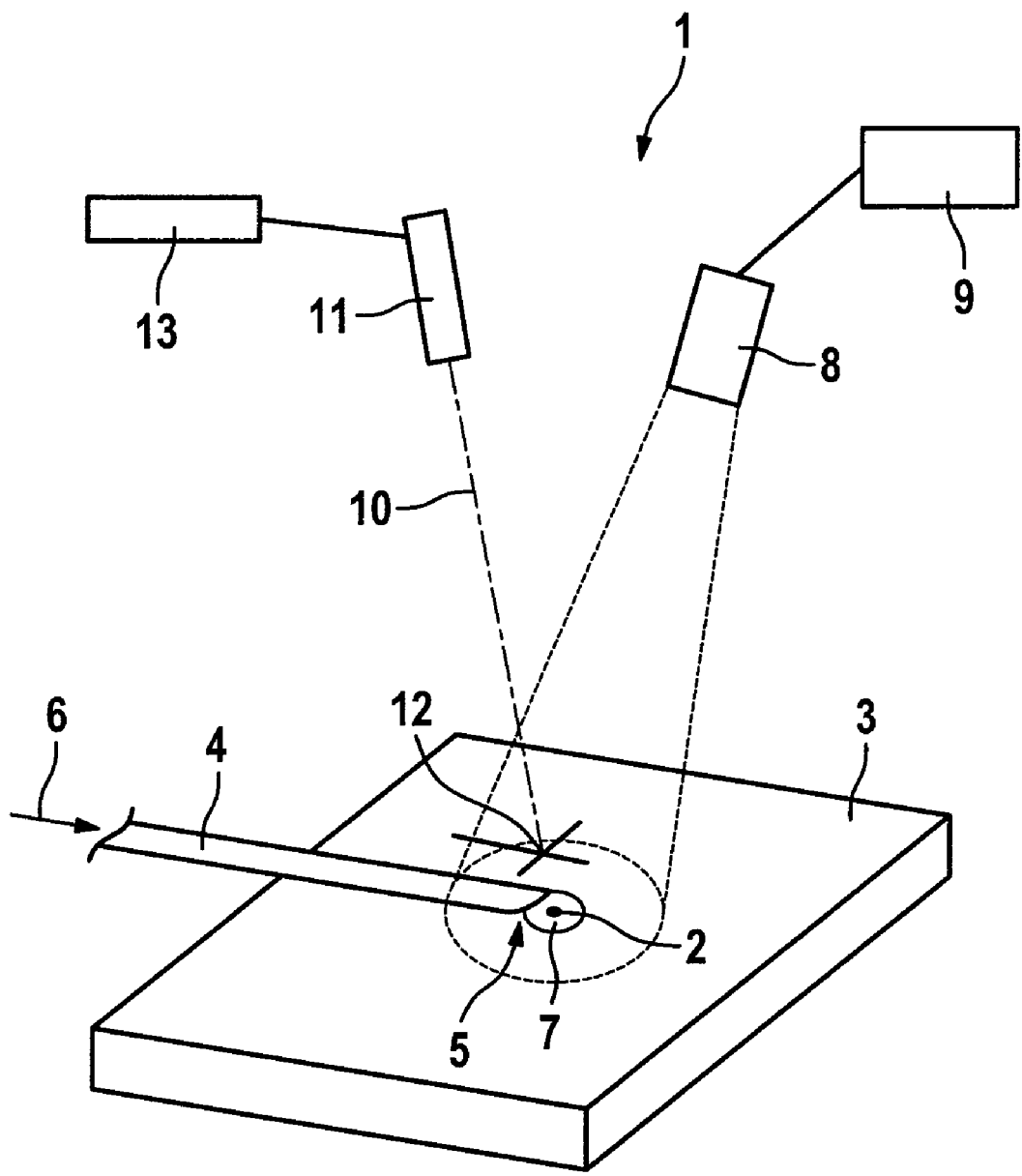

DEVICE AND METHOD FOR VISUALIZING POSITIONS ON A SURFACE

BACKGROUND AND SUMMARY OF THE INVENTION

This application claims the priority of International Application No. PCT/DE2006/002206, filed Dec. 12, 2006, and German Patent Document No. 10 2005 060 606.7, filed Dec. 17, 2005, the disclosures of which are expressly incorporated by reference herein.

The invention relates to a device and a method for visualizing positions on a surface by means of a marking which is produced by an optically detectable radiation. The present invention can be used especially advantageously to mark locations or positions on component surfaces for positioning measuring and manufacturing machines.

High requirements are placed on the technologies used in the development, manufacturing and testing of modern products in order to be able to achieve the desired manufacturing precision. Aircraft engines are a good example of these types of products that have the highest requirements for production accuracy. In particular, the positionability of tools or measuring instruments, e.g., x-ray diffractometers, relative to components is of crucial importance in the field of manufacturing and testing technology. In order to achieve high product quality with economical manufacturing processes, it is necessary first of all, for the alignment of the tools or measuring instruments emitting radiation, to provide for a marking of positions or locations on the component surface that is as free of residue as possible. These types of markings can be used to position tools or measuring instruments emitting invisible radiation on the desired positions or locations of the component surfaces. This can also be accomplished automatically by using image recognition methods.

Various methods are already in use for marking positions on a surface for determining specific component positions with the aid of automatically functioning optical recognition systems.

The simplest possibility for marking a position on a component surface is manual marking by means of colored pencils, which have adequate contrast with the surface being processed and can therefore be identified by optical recording devices such as cameras. However, the problem when manually applying these types of markings is that they are frequently not applied to precisely the same location and they are also not precisely reproducible, making it impossible to achieve consistent quality when manufacturing or testing the work specimens.

For example, automatically marking surface defects detected for reprocessing by means of image processing is already known in the field of paint defect detection and elimination from German Patent Document No. DE 197 30 885 A1. To do this, moveable and triggerable marking jets controlled by a computer system are provided to mark, with water soluble paint, locations where relevant surface defects have been detected. In contrast to a manual marking method, the automated application of the markings can be achieved with a high level of precision and reproducibility of the applied markings in terms of their shape and/or structure. A marking applied directly to the surface must be removed again following processing and/or measurement, however. This is particularly disadvantageous, if a measurement is supposed to take place at the marked location that otherwise does not affect the surface because then a separate cleaning step is required to eliminate the marking.

In addition, with certain applications there is also the problem that not any arbitrary dye may or can be used, for example, because they are not approved for use or they damage the surfaces. Thus, only certain dyes are approved in the field of aeronautical engineering for the manufacturing of modern turbine engines.

Moreover, in order to avoid cleaning the surfaces, extracting distinctive component features on the surface by means of image detection and using them for positioning measuring and manufacturing machines is known. However, this type of image detection method is involved and requires a high level of computing power for the attached image processing system in order to make online processing possible. To do so, first of all the features must be extracted from the images taken with a camera, their positions must be determined and then positioning relative to these features must be carried out. This sort of method also requires precise knowledge of the position of the component features used for determining the position.

This is not required if light structures are projected on the component surface by means of conventional light or lasers in order to mark specific positions on the surface. The advantage of this is that the to-be-marked position can be directly identified for example by crosshairs or another suitable projection so that adjusting a tool or measuring instrument on this marking is possible in a simple manner also by means of automatic image detection methods.

However, all previously described methods for visualizing positions on a surface produce to some extent considerable difficulties in the recognition of the applied or projected markings in the case of certain surface structures, for example, shiny surfaces or surfaces with very great roughness, and certain observation directions. Even for determining position, analyzed surface features such as small holes, edges or the like can only be detected with difficulty under certain recording conditions.

As a result, the objective of the invention is providing for visualizing locations or positions on component surfaces, which makes residue-free marking on any component surfaces with different degrees of roughness possible and reliably detects the marking with an optical recording device regardless of the observation direction. In particular, it is possible to detect the marking by means of a camera even in the case of extremely oblique observation directions, in which the previously described methods have considerable problems in practice.

In the case of a device of the type cited at the outset, it is provided that the device have an optical waveguide, which is coupled to a radiation source and whose light output region can be located at a desired position of the surface in order to emit optically detectable radiation at the desired position of the surface through the optical waveguide. Using an optical waveguide arranged movably, in particular directly, over the surface, it is possible to generate radiation, emitted in a defined manner from a light output region of the optical waveguide, in a bundled spot so that the desired position on the surface can be detected simply, e.g., by projection in an image processing method. Based on the inventive high intensity of the optically detectable radiation occurring at the to-be-visualized position, a cost-effective and in practice almost always uniform visualization of component locations for positioning tools or measuring instruments is achieved. This makes permanent and continuous measurement, and precise control of the guidance of the tool, measuring instrument and/or beam possible in ongoing manufacturing operation.

In order to achieve good detectability of the marking from various lines of sight, the light output region of the optical waveguide can be embodied in accordance with the invention such that the radiation is emitted in various radiation directions. In the simplest case, with an optical waveguide that is guided parallel to the surface, the light output region at the end of the optical waveguide can be slanted in such a way that the light output region is inclined with respect to the to-be-marked surface. In this case, the optically detectable radiation is emitted as a small dispersion cone from the light output region of the optical waveguide. Since the optical waveguide is arranged close to the to-be-marked surface position, this dispersion cone is small enough to mark the desired location or position in a sufficiently precise manner. At the same time, the radiation is emitted from the light output region in various spatial directions in a manner similar to a punctiform light source so that the to-be-marked position can be detected very well from many spatial directions. In particular, reflections of the optically detectable radiation occurring on the to-be-marked surface can be detected very well from different direction for this reason even in the case of smooth or rough surface structures.

Moreover, it is possible to emit a very high intensity of the radiation through the optical waveguide in a defined manner at the desired position so that the dispersion cone of the optical radiation swamps out possible stray reflections in the environment. Based on this behavior of the optical waveguide, the inventive device generates a type of self-illuminating marking, whereby the otherwise required complex and variable illumination conditions can be decisively simplified. In the process, the function of the optical waveguide is similar to that of a lighthouse, which at a defined position similar to a point light source emits optically detectable radiation of a high intensity in various spatial directions and thereby can be seen very easily from everywhere.

In this connection, an emission in many different spatial directions can be achieved simply in accordance with the invention if the light output region is embodied to be hemispherical. To do so, the end of the optical waveguide, for example, can be ground off in the shape of a hemisphere, from which the light radiation is emitted over the entire surface area of the hemisphere.

An even better emission effect in many different spatial directions is produced if the light output region is embodied to be spherical. To do so, a sphere absorbing the optically detectable radiation and emitting it again over its surface can be placed, for example, on the end of the optical waveguide or the light output region, which generates an all-around radiation effect. In this case, the diameter of the sphere is preferably greater than the diameter of the optical waveguide and/or of the light output region of the optical waveguide. The light output region can have, for example, notches or the like in a specific circumferential area of the optical waveguide.

According to the invention, the or a light output region can be embodied to be spaced apart from the end of the optical waveguide, i.e., the light output does not take place at the end of the optical waveguide. This kind of light output region can be achieved, for example, by notches on the surface of the optical waveguide, through whose shaping the type of light output can be adjusted according to the invention in such a way that detection is possible in an equally good manner from as many as possible spatial directions or from all spatial directions.

In addition, several light output regions can be provided along the optical waveguide so that at the same time several positions can be marked on the surface by one optical waveguide.

The same effect can be achieved, if, according to the invention, several optical waveguides are used, which can be positioned preferably separately. Naturally, according to the invention, it is also possible to move several optical waveguides by a common movement unit.

According to a preferred embodiment of the invention, the optical waveguide is constructed of an amorphous material. This is a suitable plastic in particular. By using an amorphous optical waveguide, the device can be used particularly well in x-ray diffractometry, because the amorphous optical waveguide does not substantially weaken the incident x-rays and does not appreciably increase the background of the backscattered radiation.

According to a preferred embodiment of the invention, the radiation source coupled to the optical waveguide generates visible light, because the visible light can be detected simply on the component surface without additional auxiliary means and can be recorded by means of standard CCD cameras. Naturally, the present invention is not limited to the use of visible light, in fact any radiation that can be detected by suitable recording devices can be used as optically detectable radiation. Wavelengths from the infrared range can be cited as an example. This could be useful for infrared cameras, which are supposed to record clearly specified points in their images as references points.

When using several optical waveguides and/or several light output regions, it is also possible to use different radiation sources of electromagnetic radiation to mark the individual output regions of the optical waveguide(s) differently from the very beginning. This is also possible when using one optical waveguide, because light can be coupled out from a specific portion of the optical waveguide in a targeted manner by the formation of the light output regions.

Moreover, according to the invention, the device can have a movement unit with a control for positioning the optical waveguide(s), a recording device that is aligned with the light output region of the optical waveguide and that has an attached image analysis unit, and/or a device to represent the direction of action of an implement, whereby the device can be located in particular together with the implement relative to the optical waveguide. The last-mentioned device for representing the direction of action of an implement can provide in particular that two light sources and a tool or implement be set up in such a way that a first beam of the first light source and a second beam of the second light source each have a flat extension and intersect in the direction of action of the implement. This type of device is described in the applicant's German Patent Application DE 10 2004 050428, whose features are herewith incorporated by reference in this application.

The foregoing devices and/or controls can be set up preferably to perform the inventive method described in the following.

In the case of the method for visualizing positions on a surface by means of a marking, produced by an optically detectable radiation, the radiation is emitted at the desired position of the surface in various spatial directions. Good detectability of the positions on the to-be-marked surface can be achieved by emitting the optically detectable radiation in various spatial directions.

This is achieved in accordance with the invention in that the radiation is emitted by an optical waveguide, whose light output region can be located relative to the surface. By using this type of optical waveguide, the radiation with high intensity can be emitted in a bundled manner at an adjustable, desired position so that a type of self-illuminating marking is generated at the light output region of the optical waveguide.

According to the invention, the radiation can be emitted by several optical waveguides and/or several output regions of an optical waveguide so that several surface locations can be identified at the same time. In order to achieve an identification of the individual markings, it can be provided in particular that an optical waveguide and/or a light output region can be controlled separately and/or a different radiation can be used for various optical waveguides and/or various output regions. To do so, for example, several radiation sources can be arranged on an optical waveguide, whose radiation is fed into certain parts of the optical waveguide. Furthermore, radiation sources can be turned on and off by being switched on and off in certain time sequences so that individual optical waveguides and/or output regions can vary by the type of signalizing.

By a movement of the light output region of the optical waveguide relative to the surface, it is also possible in accordance with the invention for a path on the surface to be predetermined or marked. This movement can be executed in a targeted manner by an appropriate control. In this way, several different surface locations can be registered by an effective line and a complete path can be predetermined, which is to be processed and/or measured. In the case of x-ray diffractometry or in other application cases, oscillations around the to-be-measured location can thereby be controlled, which are required in the analysis of material structures that are not ideal such as large grit.

According to a preferred embodiment of the method, the position of the light output region can be determined by a recording device, in particular a camera for visible light and/or infrared radiation. In this case, because of the inventive high intensity of the radiation in the light output region and a formation of a threshold value with image processing, it is possible to make sure in a simple manner that only the light cone emerging from the light output region of the optical waveguide is still detectable on the image and its position can therefore be found in a simple manner. In order to determine the position relative to the component surface, with an identical position of the recording device, the surface can also be recorded without radiation exiting from the optical waveguide so that positioning can be derived from features of the component surface. In this way, by simply subtracting the two images from each other, the position of the marking, e.g., for positioning measuring and manufacturing machines, can be obtained.

In an inventive, preferred embodiment of the method, the positions of the light output region and the direction of action of an implement on the surface can be registered by a recording device, and the direction of action of the implement can be brought into conformity with the position of the light output region. The control of a movement device of the inventive device can be used for this. To be understood under the term "implement" are both a processing tool as well as a measuring instrument, which emits invisible radiation for example, such as an x-ray diffractometer.

Additional features, advantages and application possibilities of the present invention are yielded from the following description of an exemplary embodiment and the drawing. In this case, all described and/or visually depicted features by themselves or in any combination form the subject of the present invention, also independent of their summarization in the claims or their references.

BRIEF DESCRIPTION OF THE DRAWING

The sole FIG. 1 shows a schematic three-dimensional view of an embodiment of an inventive device.

DETAILED DESCRIPTION OF THE DRAWING

The inventive device 1 for visualizing positions 2 on the surface 3 of an object being processed or measured has an optical waveguide 4, which can be moved by means of a movement unit (not shown) with a control relative to the surface 3. In the process, the optical waveguide 4 is arranged parallel to the surface 3, which can be a component surface of a turbine engine or the like. A slanted light output region 5 aligned with the surface 3 is provided on the free end of the optical waveguide 4 above the surface 3. On the opposite end, the optical waveguide 4 is attached to a radiation source 6 symbolized by an arrow, which couples the visible and/or infrared, optically detectable radiation into the optical waveguide 4. The optical waveguide 4 is positioned above the position 2 on the surface 3 in such a way that a light output cone 7 of the optically detectable radiation being emitted from the light output region 5 of the optical waveguide 4 falls in the area of the position 2 on the surface 3.

In this case, the position 2 represents a to-be-treated or to-be-measured location on the component surface 3, which is arranged in the center of the light output cone 7. The light output cone 7 is embodied in such a way that radiation is emitted in various spatial directions as uniformly as possible from the optical waveguide 4, which represents virtually a point light source, so that the emitted radiation can be detected equally well from all or many spatial directions as a point of light for example.

Instead of the depicted, slanted light output region 5 of the optical waveguide 4 that is embodied on the end of the optical waveguide 4, a sphere arranged on the end of the optical waveguide could also be provided as a light output region, and make possible an emission of the optically detectable radiation in almost every spatial direction. Furthermore, light output regions can be provided in the progression of the optical waveguide spaced apart from its end.

In order to arrange the optical waveguide 4 at the position 2 of the surface 3 in such a way that the light cone 7 is adjacent to the position 2, a movement unit (not shown) of the optical waveguide 4 is connected to a control, which can predetermine certain positions of the optical waveguide 4. For position determination, a camera or camera unit is provided as a recording device 8, which records the light output cone 7. The camera 8 is attached to an image analysis or image processing unit 9, which evaluates the camera image.

In order to be able to determine the position of the light output cone 7 relative to features (not shown in greater detail) on the surface 3, it is provided that the camera 8 take a picture in an unchanged position with the light output cone 7, i.e., with a switched-on radiation source 6, and an image with a switched-off radiation source 6 without the light output cone 7, in which the features (not shown in the drawing) can then be detected on the surface 3. By subtracting the two recorded images, the position of the light output cone 7 is then precisely known. If need be, a command can then be issued by the image analysis or image processing unit to the control of the movement unit of the optical waveguide 4 in order to bring the light output cone 7 into conformity with the desired position 2 on the surface 3.

The marking of the position 2 on the surface 3 visualized in this manner can be used in accordance with the invention to align the direction of action 10 of an implement 11, such as a tool, a measuring instrument or a radiation source, with the position 2 of the surface 3. The direction of action 10 of the tool 11 can be represented, for example, in the form of a cross 12 on the surface 3, whose elements are formed by flat extensions of the light beams of two radiation sources and adjusted in such a way that the intersection point of the cross 12 coincides with the direction of action 10 of the tool. This type of device for generating the light planes for the cross 12 is preferably mounted on the tool 11 in such a way that a movement of the tool 11 by an adjusting unit 13 has a simultaneous effect on the tool 11 and the cross 12.

The cross 12 can then also be recorded by the camera 8 and its distance from the position 2 on the surface 3 marked by the light output cone 7 can be determined by means of the image processing unit 9. As long as the cross 12 and the light cone 7 are in the line of sight of the camera 8, the direction of action 10 at the to-be-treated location or position 2 of the surface 3 can thus be guided by the image processing unit 9 acting on the adjusting unit 13.

As a result, the inventive device and the inventive method are suited for visualizing positions 2 on a surface 3 not just for marking a specific position 2 on a surface 3, but also for tracking the direction of action 10 of a tool 11.

Since the optical waveguide 4, and thus the light output cone 7, can be moved relative to the surface 3 by a movement unit (not shown), paths on the surface 3, on which the direction of action 10 of the tool 11 is tracked, can also be predetermined with this. In the case of an x-ray diffractometer, it is thus possible, for example, to generate oscillations in a controlled manner around the to-be-measured position 2, which are required for the analysis of material structures that are not ideal such as large grit.

Incidentally, the present invention makes possible cost-effective and practically constantly consistent visualization of positions 2 on a surface 3 due to the lighthouse-like functioning of the optical waveguide 4, which can be used in particular for positioning tools 11, invisible radiation from measuring instruments, for example x-rays, or the like.

The invention claimed is:

1. A device for marking a position on a surface of a component, comprising:
    an optical waveguide coupled to a radiation source, wherein a light output region of the optical waveguide is locatable above the surface and wherein optically detectable radiation is emittable at the position through the optical waveguide, wherein a to-be-treated or a to-be-measured location on the surface of the component is represented by the position, such that the position is arrangeable in a center of a light output cone of the optically detectable radiation to mark the position.

2. The device according to claim 1, further comprising a sphere disposed on the light output region and wherein a diameter of the sphere is greater than a diameter of the optical waveguide or of the light output region.

3. The device according to claim 1, wherein the optical wave guide includes a plurality of light output regions.

4. The device according to claim 1, further comprising a plurality of optical waveguides coupled to the radiation source.

5. The device according to claim 1, wherein the optical waveguide is an amorphous material.

6. The device according to claim 1, wherein the radiation is visible or infrared light.

7. The device according claim 1, further comprising a movement unit with a control for positioning the optical waveguide, a recording device that is alignable with the light output region of the optical waveguide and that has an attached image analysis unit, and a device to represent a direction of action of an implement.

8. The device according to claim 1, wherein the radiation is emittable through the optical waveguide in various spatial directions.

9. The device according to claim 1, wherein the light output region is hemispherical.

10. The device according to claim 1, wherein the light output region is spaced apart from an end of the optical waveguide.

11. A method for visualizing a position on a surface by a marking which is produced by an optically detectable radiation, comprising emitting the radiation by an optical waveguide such that the position, which represents a to-be-treated or a to-be-measured location on the surface, is arranged in a center of a light output cone of the emitted radiation to mark the position.

12. The method according to claim 11, wherein the radiation is emitted by an optical waveguide, whose light output region is locatable relative to the surface.

13. A method for visualizing a position on a surface by a marking which is produced by an optically detectable radiation, comprising:
    emitting the radiation by an optical waveguide such that a light output cone of the emitted radiation falls in an area of the position on the surface; and
    predetermining a path on the surface by a movement of the light output cone relative to the surface.

14. A method for visualizing a position on a surface by a marking which is produced by an optically detectable radiation, comprising:
    emitting the radiation by an optical waveguide such that a light output cone of the emitted radiation falls in an area of the position on the surface; and
    determining a position of the light output cone by a recording device.

15. A method for visualizing a position on a surface by a marking which is produced by an optically detectable radiation, comprising:
    emitting the radiation by an optical waveguide such that a light output cone of the emitted radiation falls in an area of the position on the surface;
    registering a position of the light output cone and a direction of action of an implement on the surface by a recording device; and
    aligning the direction of action of the implement with the position of the light output cone.

* * * * *